United States Patent [19]

Aleff

[11] 4,131,135
[45] Dec. 26, 1978

[54] ONE WAY CHECK VALVE CONSTRUCTION

[76] Inventor: Hans Peter Aleff, Old Sneech Pond Rd., Pole 188, R.D. 2, Cumberland, R.I. 02864

[21] Appl. No.: 813,216

[22] Filed: Jul. 5, 1977

[51] Int. Cl.² ............................................. F16K 15/14
[52] U.S. Cl. ................................................. 137/856
[58] Field of Search ................ 137/855, 856, 857, 858

[56] References Cited

U.S. PATENT DOCUMENTS

| 1,169,718 | 1/1916 | Garrett | 137/527 |
| 2,512,694 | 6/1950 | Stout et al. | 137/855 X |
| 2,948,300 | 8/1960 | Fraser | 137/855 X |
| 3,066,696 | 12/1962 | Hansley | 137/855 X |
| 3,507,586 | 4/1970 | Gronemeyer et al. | 137/855 X |
| 3,726,446 | 4/1973 | Hays | 137/855 X |
| 3,814,124 | 6/1974 | Bell | 137/855 |

FOREIGN PATENT DOCUMENTS 1404181  8/1975  United Kingdom ..................... 137/855

*Primary Examiner*—William R. Cline
*Attorney, Agent, or Firm*—Robert J. Doherty

[57] ABSTRACT

A one-piece integral construction check valve molded of resinous plastic material is disclosed. The valve has a body and a cover including first and second cover portions. The first cover portion is hingedly connected to the body and the second cover portion in turn connected to the first cover portion. The cover portions are spaced from each other by a molded recess above a hinge connection which through plastic memory acts to downwardly bias the second cover portion into sealing engagement with the upper surface of the body portion so as to normally seal a fluid transmitting opening disposed therethrough into a closed position. Differential pressure within the passageway in which the valve is adapted to be mounted serves to hingedly pivot the second cover portion upwardly about the first portion to uncover the opening and therefore open the valve.

8 Claims, 5 Drawing Figures

ONE WAY CHECK VALVE CONSTRUCTION

BACKGROUND OF THE INVENTION

This invention relates to a one way check valve construction and more particularly to a valve designed to enable fluid to pass from a container to a pump mechanism such as found in dispensing containers. Normally such containers utilize a gravity actuated ball check valve which requires that the container be in an upright position during use. Other alternate valve constructions are known, however, it would be desirable to provide a valve construction which inherently will close a fluid receiving passageway regardless of the positioning of the structure in which such valve is mounted and which is of low cost, durable construction and of an easily formed configuration. A further desirable feature of such valves would be their formation from a single element thereby avoiding the necessity of assembling the several components of prior art valve constructions into an operable assembly. Such a one piece valve would accordingly not only avoid assembly costs but would further ensure reduced inventory and a desirable simplicity of operation.

It is accordingly a primary object of the present invention to provide a valve of integral one piece construction formed of molded plastic material which, when positioned in a fluid passageway, will serve, in the absence of differential pressure on opposite sides of such passageway, to bias a fluid receiving opening therethrough into a normally closed position.

A further object of the present invention is the provision of a valve construction of the aforementioned type in which a differential pressure on the lower side thereof will serve to upwardly hinge a portion thereof to an open position thus permitting fluid passage by such valve.

A still further object of the invention is the provision of a valve constructed in accordance with the immediately aforementioned objects in which the inherent plastic memory of cover portions thereof serves to normally bias the valve into a closed position and which positioning is accordingly not dependent on the attitude of the container or other element in which such valve is positioned.

These and other objects of the invention are accomplished by the provision of a valve having a generally tubular body to which a cover is hingedly connected. The cover in turn is formed of first and second cover portions also hingedly connected to each other. The cover is adapted for at least partial aligned positioning with respect to the body on top thereof wherein the hinged connection between the body and cover is restrained from further movement and wherein the second hinge connection normally biases the second cover portion downwardly against the tubular portion to form a fluid tight seal therewith.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
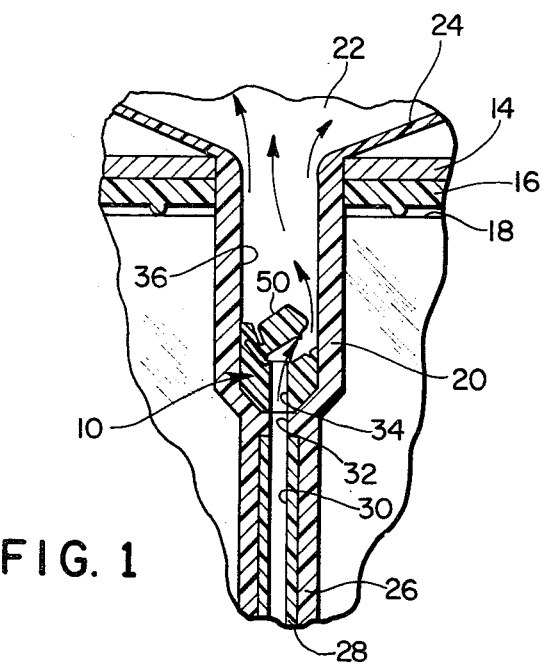
FIG. 1 is a partial sectional view of a container pump assembly showing in particular a portion of the diptube and product receiving chamber thereof between which the valve structure of the present invention is adapted for positioning, the valve being shown in its open position.
Figure 2:
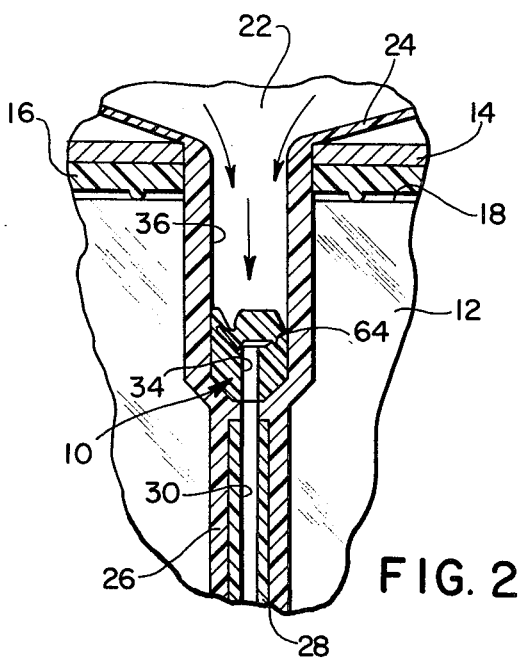
FIG. 2 is a partial sectional view similar to FIG. 1 but showing the valve of the present invention in a closed position.

Turning now to the drawing and in particular FIGS. 1 and 2 thereof, the valve 10 of the present invention is adapted for positioning within a container 12 having a cap 14 and a seal 16 adapted for engagement between the cap 14 and the upper rim 18 of the container 12. The cap and seal are provided with a central opening into which a tubular housing 20 is adapted to fit. Such housing may have an upper chamber 22 for receipt of fluid such as liquid or gaseous product contained within the container 12 as enclosed by a bellows or other such equivalent structure 24. The lower portion of the body is provided with an extension 26 adapted in turn to receive a diptube 28. The diptube and the lower portion of the body 20 are provided with openings 30,32 respectively which openings are in turn adapted for alignment with an opening 34 passing through the valve 10.

A higher differential pressure within the container 12 as caused by the squeezing of the container or the presence of a partial vacuum within the chamber 22 will cause the valve which is normally positioned in a closed position to open so as to permit fluid to pass from the lower portions of the container 12 upwardly into the product receiving chamber 22. Such action and structure to accomplish such as above explained is common in the container dispensing art and except for the manner in which it interrelates to the present valve construction forms no part of the present invention. In fact, other conventional dispensing container assemblies could be utilized or the valve construction of the present invention could be used in other environments where it is desirable to control the flow of fluid within a passageway.

Figure 3:
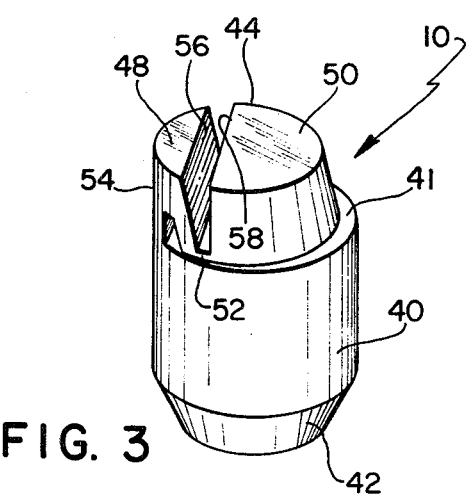
FIG. 3 is a perspective view on an enlarged scale showing the valve construction of the present invention in a closed position such as depicted in FIG. 2.
Figure 4:
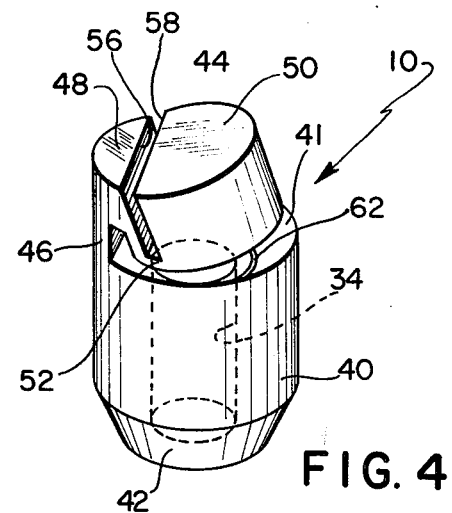
FIG. 4 is an enlarged perspective view of a valve constructed in accordance with the present invention in an open position such as shown in FIG. 1.

Turning now to FIGS. 3 and 4 of the drawing, the construction of the novel valve of the present invention is more clearly illustrated. Therein the valve includes a tubular body portion 40 having a lower seat 42 of generally conical configuration for disposition within a shouldered passageway such as the passageway 36 illustrated. Other equivalent means of mounting the valve 10 within a passageway 36 such as frictional fit or adhesive connection are also possible and in such case it may not be necessary or desirable to include the conically tapered portion 42. The fluid receiving opening 34 is disposed generally centrally of the tubular body portion 40 so that it is not necessary to specially orientate the valve within the passageway 36. A cover 44 is hingedly connected to the body 40 by means of a hinge 46 integrally connected thereto. The cover 44 is in turn formed of a first cover portion 48 and a second cover portion 50, which cover portions are integrally connected to each other about another hinge 52 which transversely extends across the cover 44 at the bottom edge thereof.

Figure 5:
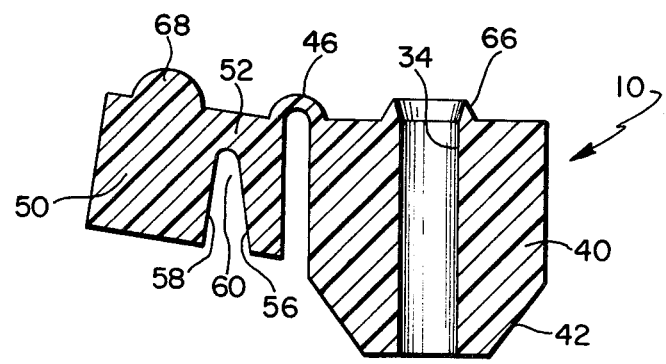
FIG. 5 is a side sectional view of a valve in its "as molded" position and showing a further constructional embodiment thereof.

As may best be seen by reference to FIG. 5, the cover and body portions of the valve are molded as by injection molding techniques in an open, that is, a laterally side by side position, and thereafter closed as shown in FIGS. 3 and 4 for assembly into the passageway 36. In that regard the side wall portion of the first cover portion 48 proximal to the hinge 46, as indicated by reference numeral 54, is adapted for engagement with the walls of the passageway 36, along with the side walls of the tubular body portion 40. Such action, in effect, at least partially anchors the first cover portion 48 and the body portion 40 together, and by reason of the relative dimensions of the cover 44 or at least the second portion 50 thereof and the body 40 assures that the second cover portion is forced against the sealing surface 41 to an extent that such second cover portion 50 is upwardly pivoted to some degree about the hinge connection 52.

Also, by reference to FIG. 5, it will be seen that the cover portions 48,50 include side wall segments 56 and 58 respectively, which are positioned in opposed but spaced relationship to each other, such space being provided for by a molded recess 60 of generally U or V-shaped cross-sectional configuration. Due to the inherent plastic memory of the material from which the valve is formed, i.e. polyethylene, polypropylene, Celcon, etc., when the valve 10 is positioned within the passageway, the second cover portion 50 will be inherently urged downward to its original "as molded" position and against the upper sealing surface 41 of the body 40 about the hinge 52. The differential pressure needed to open the valve, that is, pivot cover portion 50 upwardly above hinge 52 naturally must be of a force larger than that exerted by the plastic memory force above described. Also the lateral extent of the second cover portion 50 is such that it does not fully cover the upper surface 41 but is short thereof so as to, when positioned within the passageway 36, be spaced from the opposite walls thereof. In this manner, then, when differential pressure on the lower side of the valve forces the second cover portion 50 upwardly about the hinge connection 52, the right hand edge of the second cover portion as viewed in the drawings will not contact the passageway walls.

Generally it is desirable to provide the sealing surface 41 with sealing means such as the circular recess 62 which surrounds the opening 34 and into which a ring 64 downwardly extending from the lower surface of the second cover portion 50 is adapted to engage and in this manner provide for a more assured fluid tight relationship between the cover 44 and the body 40. FIG. 5 discloses an alternate constructional embodiment for such sealing means in the form of an upwardly extending ring 66 surrounding the upper periphery of the fluid opening 34 and into which a downwardly extending spherical portion 68 is adapted to project. In either case it is not necessary that the lower portions of the cover 44 entirely contact the top sealing surface 41 of the body 40 so long as sealing contact about the opening 34 is made. It should also be clear that it is the second cover portion 50 by reason of its hinged connection about the transverse hinge 52 that enables the pivotal connection which brings about the opening and closing action of the valve.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the apended claims.

What is claimed is:

1. A valve adapted for positioning in a tubular passageway so as to permit the flow of fluid in one direction therethrough, said valve of one piece integrally molded plastic resinous composition and having a tubular body for fluid tight contact with the inner walls of said passageway, said body having a generally longitudinally orientated generally centrally disposed fluid receiving opening extending therethrough from a bottom surface thereof and terminating at an upper surface thereof, a molded plastic cover having first and second portions, said first cover portion hingedly connected to said body along one side thereof by a first hinge, said second cover portion hingedly connected to said first cover portion along an integral transversely extending second hinge connection proximal the upper surface of said body, said second portion having a lower face portion adapted for sealing contact with said upper body surface when said valve is disposed in said tubular passageway with outer surface portions of said first hinge contacting said passageway so as to rotationally upwardly bias said second portion about said second hinge against the natural plastic memory tendency of said second portion to assume its original as molded position with respect to said first portion, said second hinge by plastic memory normally urging said second portion downwardly against said upper body surface in sealing contact therewith so as to close said fluid receiving opening in a closed valve position, said second portion pivotally movable about said second hinge and towards said first cover portion to a non-sealing open valve position upon the application of a differential pressure thereto.

2. The valve set forth in claim 1, said cover and said body molded in an open side by side position integrally connected to each other by said first hinge, said first hinge normally rotationally urging said cover away from said body.

3. The valve set forth in claim 2, said body and cover first connecting hinge connected to said first cover portion and having an outer surface adapted for contact with the walls of said passageway whereby said cover is prevented from rotational movement about said body and said second cover portion is forcibly urged against said upper body surface.

4. The valve set forth in claim 1, said first and second cover portions each having a side wall segment upwardly extending from the said second hinge connection, said side wall segments disposed in spaced opposition to each other by a laterally extending recess, said wall segments adapted to move towards each other to narrow the width of said recess when the second cover position is upwardly biased away from said upper body surface in said open valve position.

5. The valve set forth in claim 4, said upper body surface having sealing means encircling said fluid receiving opening terminating thereat, means provided on the lower surface of said second cover portion for engaging said sealing means in said closed cover position for sealing said opening.

6. The valve set forth in claim 5, said upper body surface sealing means being an upstanding rim surrounding the periphery of said opening and said means on said second cover portion for engaging said sealing means being a downwardly extending rounded element adapted to fit within said rim when said cover is in its closed position.

7. The valve set forth in claim 5, said upper body surface sealing means being a circular recess concentrically spaced from the periphery of said opening and said means on said second cover portion for engaging said sealing means being a downwardly extending ring adapted to fit within said circular recess when said cover is in its closed position.

8. The valve set forth in claim 1, that side of the second cover portion distal from said first cover portion terminating inwardly of the outer extent of said tubular body so as to be spaced from the wall of said passageway and accordingly not contact said wall when said second cover portion is upwardly pivoted about said second hinge connection to said open valve position.

* * * * *